United States Patent [19]

Fraser et al.

[11] 4,452,519
[45] Jun. 5, 1984

[54] FOLDING CAMERA HAVING ERECTABLE LIGHT SOURCE

[75] Inventors: Richard J. Fraser, Franklin; Robert S. Pesce, Woburn; Donato F. Pizzuti, Lynnfield, all of Mass.

[73] Assignee: Polaroid Corporation, Cambridge, Mass.

[21] Appl. No.: 450,282

[22] Filed: Dec. 16, 1982

[51] Int. Cl.³ ................. G03B 17/04; G03B 13/02
[52] U.S. Cl. .............................. 354/126; 354/187
[58] Field of Search ............. 354/126, 187, 192, 193, 354/194, 158

[56] References Cited

U.S. PATENT DOCUMENTS

| | | | |
|---|---|---|---|
| 3,479,941 | 11/1969 | Erlichman | 354/187 |
| 3,683,770 | 8/1972 | Land et al. | 354/193 |
| 4,166,683 | 9/1979 | Ito et al. | 354/192 |
| 4,291,959 | 9/1981 | Easterly | 354/31 |
| 4,316,658 | 2/1982 | Bundschuh et al. | 354/27 |
| 4,389,110 | 6/1983 | Pizzuti | 354/187 |
| 4,392,732 | 7/1983 | Pizzuti | 354/187 |
| 4,395,102 | 7/1983 | Pizzuti | 354/187 |

FOREIGN PATENT DOCUMENTS 694711 7/1953 United Kingdom .

Primary Examiner—Benjamin R. Fuller
Assistant Examiner—Douglas S. Lee
Attorney, Agent, or Firm—Alfred E. Corrigan

[57] ABSTRACT

A folding camera including a plurality of housings pivotally coupled to each other for movement between a folded inoperative position and an extended operative position wherein image-bearing light rays are directed toward a length of film supported within one of the housings for photographically exposing the same. Another of the housings carries a source of artificial illumination, e.g., a strobe, which is adapted to move automatically into an erected operative position as the housing moves into the extended operative position. During such movement, the source of artificial illumination moves into engagement with one of the housings to thereby releasably latch the camera in its extended operative position. Movement of the source of artificial illumination in the opposite direction is used to rotate a mirror toward a fully down or non-reflecting position.

12 Claims, 3 Drawing Figures

FOLDING CAMERA HAVING ERECTABLE LIGHT SOURCE

RELATED APPLICATION

This application is related to application Ser. No. 450,284 entitled "Lever for Folding a Camera Having a Retractable Light Source," filed Dec. 16, 1982, in the name of Jonathan I. Kaplan, and assigned in common herewith.

BACKGROUND OF THE INVENTION

1. Field of the Invention

The invention relates to a folding camera.

2. Description of the Prior Art

The present invention relates to a folding camera and, more particularly, to a folding camera of the type having a source of artificial illumination, e.g., a strobe, which is mounted within one of the housings of the camera for movement between a retracted inoperative position and an erected operative position. It is well known to provide non-collapsible cameras with movably mounted strobes, as evidenced by U.S. Pat. Nos. 4,316,658 and 4,291,959. The same can be said of folding cameras; for example, see U.S. Pat. No. 4,166,683. However, it appears from the above examples of the prior art that the strobe is unifunctional in that it performs its function of artificially illuminating a scene, and nothing else.

From the foregoing it can be seen that a more compact and inexpensive camera can be obtained by utilizing components thereof, e.g., a strobe, in such ways that each performs a multiplicity of functions.

SUMMARY OF THE INVENTION

The instant invention relates to a folding camera and, more particularly, to one having a source of artificial illumination which is constructed to perform a plurality of functions. The camera includes first, second and third housings which are pivotally interconnected for movement between a compact, folded, inoperative position and an extended operative position in which a shutter and lens assembly in the third housing directs light from a scene to a mirror assembly positioned adjacent the second housing which, in turn, reflects the light towards a length of film supported within the first housing. The third housing includes a recess or chamber which is adapted to enclose the source of artificial illumination, preferably a strobe, when the strobe is in a retracted inoperative position. The strobe is constructed to automatically move into an opening near one end of the second housing as the three housings enter the extended operative position thereby positioning itself for subsequent illumination of a scene to be photographed as well as effectively latching the second and third housings against further movement relative to each other and to the first housing.

When the housings of the camera are in the folded inoperative position, the length of the camera is maintained at a minimum by having previously rotated the third housing back onto the first housing rather than in the opposite direction where it would add to the overall length of the folded camera. However, in the particular camera described herein, in order to prevent damage to the camera's bellows it is desirable to move the mirror assembly almost fully into a down position before the third housing can be pivoted back onto the first housing and the mirror assembly. This movement of the mirror assembly is accomplished by utilizing the movement of the strobe into its retracted inoperative position to drive a link assembly which is connected to the mirror assembly.

An object of the invention is to provide a folding camera with a source of artificial illumination which, when in an erected operative position, functions to releasably lock the camera in an extended operative position as well as illuminate a scene being photographed.

Another object of the invention is to provide a folding camera having a mirror for reflecting light toward a length of film and a source of artificial illumination for illuminating a scene to be photographed with means for transferring movement of the source of artificial illumination toward a retracted position to the mirror for lowering it toward an inoperative position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

DETAILED DESCRIPTION OF THE INVENTION

Figure 1:
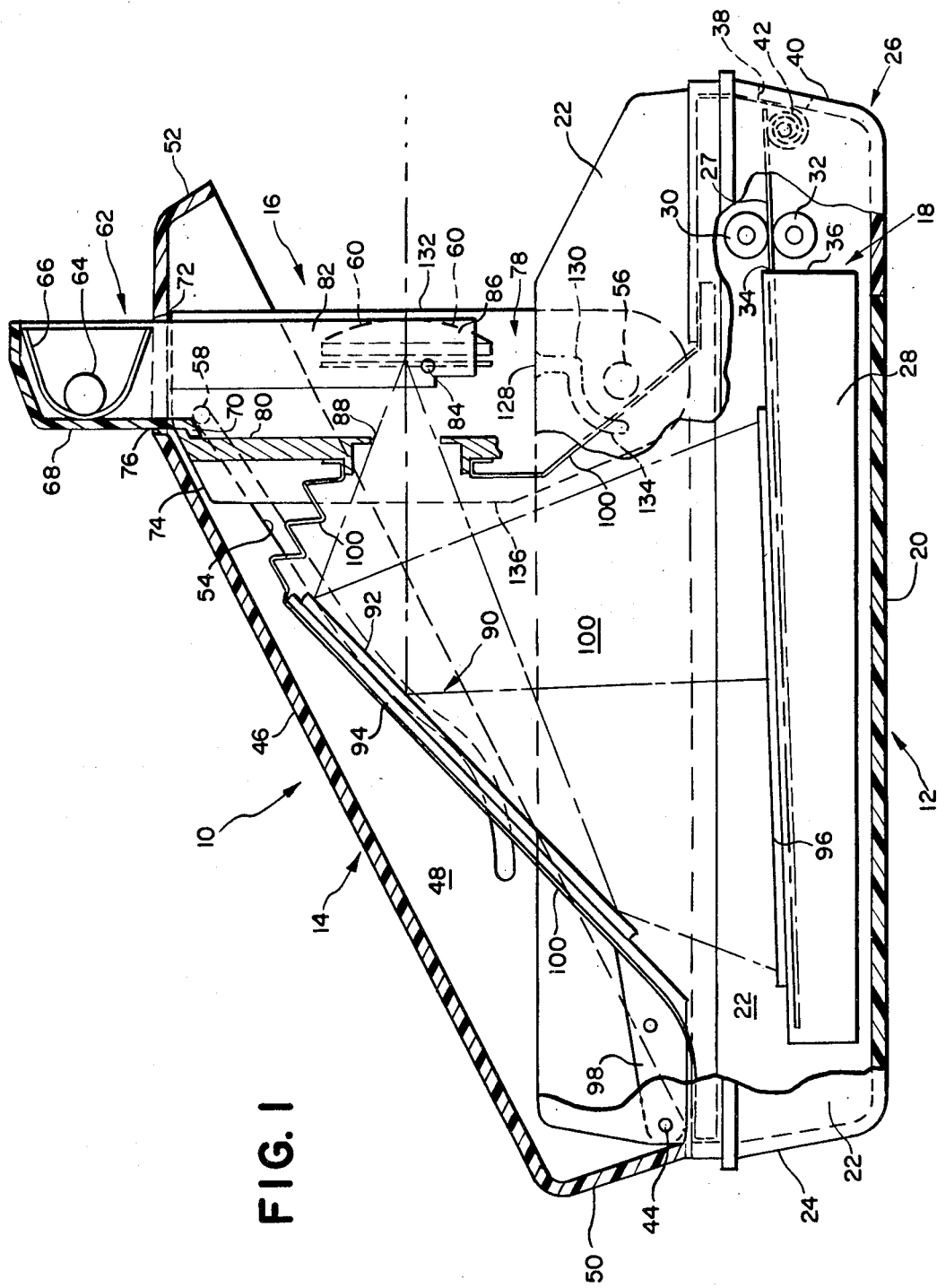
FIG. 1 is a side elevational view, partly in section, of a folding camera which incorporates a preferred form of the invention, the camera being shown in its extended operative position.
Figure 2:
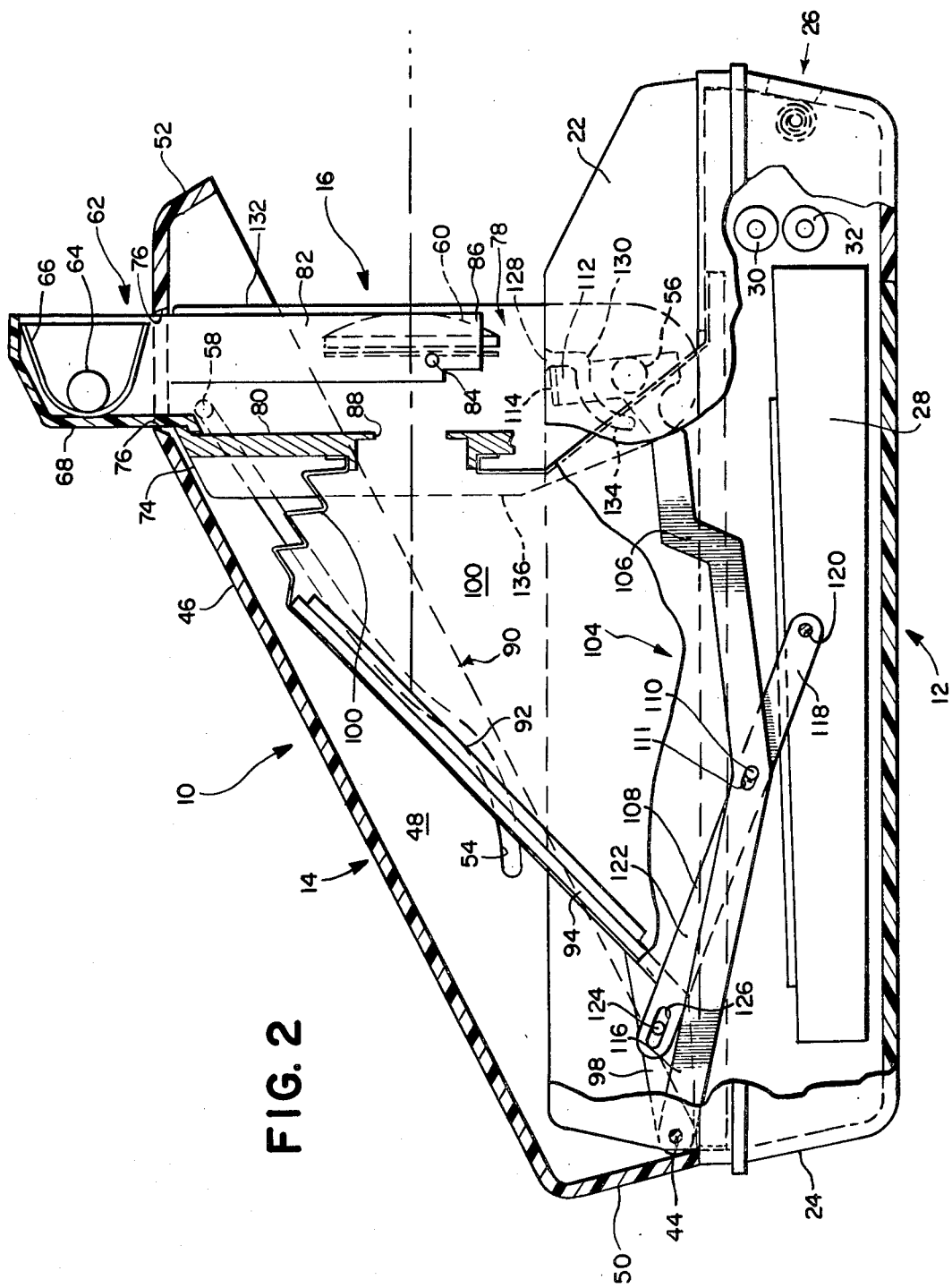
FIG. 2 is a view similar to FIG. 1 with several parts omitted so as to clearly show the interrelation between a strobe assembly, a mirror assembly, and a linkage system for transferring downward movement of the strobe to the mirror assembly.
Figure 3:
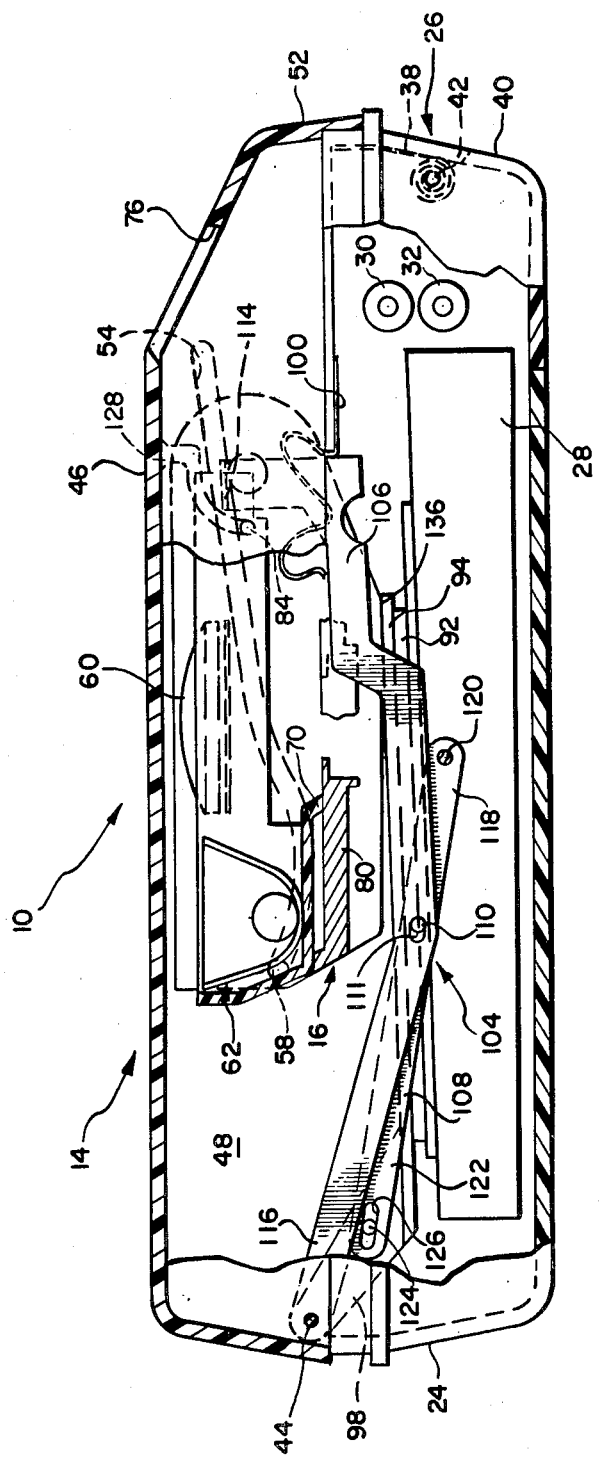
FIG. 3 is a view similar to FIG. 2 showing the various housings of the camera in their folded inoperative position.

Reference is now made to the drawings wherein is shown a folding camera 10. The camera 10 includes first, second and third housings 12, 14 and 16 which are pivotally interconnected for movement between an extended operative position, as shown in FIGS. 1 and 2, and a folded inoperative position, as shown in FIG. 3.

The first housing 12 includes a chamber 18 having a bottom wall 20, a pair of side walls 22, and a trailing end wall 24. An open end of the chamber 18 is closed by a spread roller housing 26 which is pivotally connected to the housing 12 such that it may be pivoted in a clockwise direction, as viewed in FIG. 1, to a position wherein a film cassette 28, containing a plurality of film units of the self-developing type, may be inserted endwise into the chamber 18. The spread roller housing 26 may then be returned to the position shown in FIG. 1 where a pair of cylindrical rollers 30 and 32, at least one of which is motor driven, are mounted in position to receive therebetween an exposed film unit 27 as it is being advanced from the film cassette 28 via an exit slot 34 in a leading end wall 36. As is well known in the art, the rollers 30 and 32 are adapted to rupture a pod of processing liquid attached to a leading end of the exposed film unit 27 and spread its contents between layers of the film unit to initiate the formation of a visible image while simultaneously advancing it to the exterior of the camera via an egress 38 in a leading end wall 40 of the housing 26. As the exposed film unit 27 is moved through the egress 38, its leading end engages and unwinds a resilient opaque shade 42 which progressively completely covers the upper surface of the film unit 27 so as to momentarily protect its photosensitive layer from further exposure by the ambient light. For a more detailed description of the interaction between the film, the spread rollers 30 and 32, and the shade 42, reference may be had to U.S. Pat. No. 3,940,774 granted to A. S. Ivester on Feb. 24, 1976, and assigned in common herewith.

The second housing 14 is pivotally coupled to a first end of the first housing 12 by a hinge 44. The second housing 14 includes a top wall 46 from which depend a pair of side walls 48 (only one being shown), a trailing end wall 50, and a leading end wall 52. A cam track 54 is formed in the interior surface of each of the side walls 48.

The third housing 16 has one of its ends pivotally coupled to the first housing 12 at a hinge 56 located near a second end thereof. A second end of the third housing 16 is pivotally coupled to a second end of the second housing 14 via a pin 58 which extends outwardly from each lateral side of the housing 16; each pin 58 being located within its respective cam track 54. Mounted within the third housing 16 is a lens and shutter assembly 60, and to the near side of the housing 16, as viewed in FIG. 1, a source of artificial illumination, preferably a strobe 62, is mounted for linear movement within a recess 78.

The strobe 62 includes a lamp 64 mounted within a reflector 66 which, in turn, is mounted within a frame 68. The strobe 62 includes a stop 70 which is adapted to engage an interior surface of a wall 74 to limit upward movement of the strobe 62 into its erected position. As the strobe 62 moves into its erected operative position, the frame 68 moves out of the housing 16 via an opening 72 in the wall 74 of the housing 16 and through an opening 76 in the top wall 46 of the second housing 14. The dimensions of the frame 58 are slightly smaller than the corresponding dimensions of the opening 76 thereby insuring that there is no substantial movement therebetween when the strobe 62 is in its erected operative position. In its retracted inoperative position, the strobe 62 is substantially fully enclosed by the housing 16. Extending downwardly from the frame 68 is an extension 82 having an outwardly extending pin 84 located adjacent its end 86, the function of which will be explained shortly.

The lens and shutter assembly 60 is adapted to direct image-bearing light rays through an aperture 88 in a wall 80 and onto the reflecting surface of a mirror assembly 90 which includes a mirror 92 secured to a supporting member 94. The rays are redirected by the reflecting surface of the mirror 92 toward a film unit 27 located within the film cassette 28 adjacent to and in alignment with a generally rectangularly shaped exposure aperture defined by an upstanding rib 96. The supporting member 94 includes an extension 98 by which the supporting member 94 is pivotally secured to the hinge 44. Suitable spring means (not shown) resiliently bias the mirror assembly 90 into its operative reflecting position.

A flexible opaque bellows 100 is secured to the first and third housings 12 and 16, as shown in FIG. 1, and to the lower portion of the rear surface of the supporting member 94. In order to enable relative pivoting movement between the third housing 16 and the mirror assembly 90 without stressing the bellows 100, the upper two-thirds of the rear surface of the supporting member 94 is not secured to the adjacent portions of the bellows 100.

As best shown in FIGS. 2 and 3, the first housing 12 is constructed to enclose a linkage assembly 104 which is adapted to transmit movement of the strobe 62 into its retracted inoperative position into rotation of the mirror assembly 90 toward a fully down or non-reflecting position before the third housing 16 is unlatched from the second housing 14. More specifically, the linkage assembly includes first and second links 106 and 108 pivotally connected together intermediate their ends by a pin 110 which extends outwardly from the link 108 and rides in a slot 111 in the link 106. The first link 106 includes one end 112 having an outwardly extending flange 114 located in position to be engaged by the end 86 of the strobe extension 82 as the strobe 62 is moved toward its retracted inoperative position, and a second opposite end 116 pivotally coupled about the axis of hinge 44. The second link 108 includes a first end 118 pivotally coupled at 120 to the first housing 12, and a second end 122 pivotally coupled to the extension 98 of the mirror support 94 via a pin 124 which extends outwardly therefrom and rides in a slot 126 in the second link 108.

The first, second and third housings 12, 14 and 16, respectively, are maintained in the extended operative position, as shown in FIGS. 1 and 2, by the interaction between the frame 68 of the strobe 62 and the cover 46 of the second housing 14, when the strobe 62 is in its erected operative position. When it is desired to fold the camera, the operator merely pushes the strobe 62 downwardly until the strobe frame 68 leaves the opening 76 in the top wall 46 of the second housing 14. During this movement, the end 86 of the strobe extension 82 moves into engagement with the flange 114 on the link 106 and rotates it in a clockwise direction about the pivot 44 until the link 106 is located substantially in, but not completely in, the position shown in FIG. 3. Clockwise rotation of the link 106 is transmitted to the link 108 via the pivotal interconnection therebetween at 110 and 111 thereby causing the link 108 to rotate in a counterclockwise direction about its fixed pivot 120. This rotation of the link 108 is transmitted to the mirror assembly 90 via the pin 124 and slot 126 coupling to drive the mirror assembly 90, against its spring bias, substantially into, but not completely into, the position shown in FIG. 3. Substantially all of this movement of the links 106 and 108 and the mirror assembly 90 occurs before the strobe frame 68 clears the opening 76 in the second housing wall 46, thereby insuring that the third housing 16 cannot be rotated into a folded position until the mirror assembly 90 has been moved out of interference therewith. Also, during the latter part of the downward movement of the strobe 62, the pin 84 on the extension 82 enters the open end of a slot 128 located in an interior surface of the side wall 22 of the first housing 12. Downward movement of the strobe 62 is terminated when the pin 84 bottoms out in the end 130 of the slot 128. Next, while maintaining the strobe 62 in the retracted position, the operator applies a force to the face 132 of the third housing 16 so as to rotate it in a counterclockwise direction about its pivot 56. Such rotation is effective to rotate the pin 84 into an arcuate slot 134 which is located in communication with the end 130 of the slot 128, thus locking the strobe 62 in its retracted inoperative position. Also, rotational movement of the third housing 16 is transmitted to the second housing 14 via the pin 58 and cam track 54 couplings to initially cause a few degrees of counterclockwise rotation of the second housing 14 about the hinge 44 thereby enabling the top wall 74 of the third housing 16 to clear the top wall 46 of the second housing 14. Continued counterclockwise rotation of the third housing 16 then causes the second housing 14 to reverse its rotation, i.e., rotate in a clockwise direction, as it follows the third housing 16 into the folded position shown in FIG. 3. As mentioned hereinabove, the mirror assembly 90 is close to, but not into, its fully down position when the strobe 62 originally enters its retracted position. This is because a rear surface 136 of the third housing 16 engages the mirror supporting member 94 during its last two or three degrees of counterclockwise rotation and rotates the mirror assembly 90 into its fully down position. Suitable means (not shown) such as friction latches on the first and second housings 12 and 14, respectively, may be used to maintain the camera 10 in the folded position.

Movement of the housings 12, 14 and 16 into the extended operative position is accomplished by holding the housing 12 in one hand while simultaneously grasping the housing 14 and rotating it in a counterclockwise direction about the hinge 44. Movement of the housing 14 is transmitted to the housing 16 via the pin 58 and cam slot 54 couplings to rotate it in a clockwise direction about its pivot 56. During the first two or three degrees of rotation of the housing 16, the end 112 of the link 106 follows the rear surface 136 of the housing 16 until the flange 114 again engages the end 86 of the strobe extension 82, such link movement being under the bias of the mirror assembly 90 biasing springs (not shown). The rotation of the housings 14 and 16 is continued until the pin 58 nears the end of the cam slot 54. At this time, the frame 68 of the strobe 62 moves into alignment with the opening 76 in the top wall 46 of the housing 14, and the pin 84 into the end of the slot 128. The bias of the mirror assembly's springs, acting through the linkage assembly 104 move the strobe 62 into its erected operative position, as shown in FIGS. 1 and 2 wherein it releasably locks or latches the housings 14 and 16 against further movement relative to each other or to the housing 12. Simultaneously, the mirror assembly 90 is driven into its operative reflecting position. The movement of the mirror assembly 90 is stopped when the stop 70 on the strobe 62 engages the top wall 74 of the housing 16.

Since certain changes may be made in the above-described invention without departing from the scope thereof, it is intended that all matters contained in the above description or shown in the accompanying drawings shall be interpreted as illustrative and not in a limiting sense.

What is claimed is:

1. A folding camera comprising:
a first housing having first and second ends, said first housing being adapted to support a film cassette in position for the exposure of a length of film contained therein;
a second housing pivotally mounted adjacent said first end of said first housing;
a third housing having one end thereof pivotally coupled to said first housing near said second end of said first housing, said third housing further includes a second end which is pivotally coupled to a second end of said second housing thereby enabling movement of said first, second and third housings between a folded, compact, inoperative position and an extended, operative position wherein light may be directed toward said first housing so as to photographically expose the length of film; and
a source of artificial illumination coupled to said third housing for movement between a retracted inoperative position, when said first, second and third housings are out of said extended operative position, and an erected operative position in which it cooperates with said second end of said second housing to releasably lock said first, second and third housings in said extended operative position.

2. A folding camera as defined in claim 1 wherein said second housing includes an aperture through which said source of artificial illumination automatically projects as said first, second and third housings move into said extended operative position thereby releasably locking said second and third housings against further movement.

3. A folding camera as defined in claim 2 wherein said third housing includes a recess into which said source of artificial illumination is adapted to be moved as it moves into its said retracted inoperative position.

4. A folding camera as defined in claim 3 further including a lens and shutter assembly mounted within said third housing and a mirror assembly mounted within said second housing for redirecting image-bearing light rays from said lens and shutter assembly towards the film supported by said first housing when said first, second and third housings are in said extended operative position.

5. A folding camera as defined in claim 4 wherein said third housing is sandwiched between said first and second housings when said first, second and third housings are in said folded position.

6. A folding camera as defined in claim 4 further including means for pivotally connecting said mirror assembly for movement relative to said second housing.

7. A folding camera as defined in claim 6 further including a means mounted within said first housing for transmitting movement of said source of artificial illumination into said retracted inoperative position into rotation of said mirror assembly toward a fully down position before said third housing is unlatched from said second housing.

8. A folding camera as defined in claim 7 wherein said transmitting means includes first and second links pivotally connected together intermediate their ends, said first link having one end thereof located in position to be engaged by said source of artificial illumination as it is moved towards its retracted inoperative position and a second opposite end mounted about an axis common with the pivotal axis of said mirror assembly, and said second link includes a first end pivotally coupled to said first housing and a second end pivotally connected to said mirror assembly.

9. A folding camera as defined in claim 7 wherein said third housing engages and completes the movement of said mirror assembly into its fully down position as it moves into its folded inoperative position.

10. A folding camera comprising:
a first housing having first and second ends, said first housing being adapted to support a film cassette in position for the exposure of a length of film contained therein;

a second housing pivotally mounted adjacent said first end of said first housing;

a mirror assembly pivotally mounted between said first and second housings for movement between an image reflecting position and a non-reflecting position wherein it lies closely adjacent to and substantially parallel with said first housing;

a third housing having one end thereof pivotally coupled to said first housing near said second end of said first housing, said third housing further includes a second end which is pivotally coupled to a second end of said second housing thereby enabling movement of said first, second and third housings between a folded, compact, inoperative position and an extended, operative position wherein light may be directed toward said first housing by said mirror assembly so as to photographically expose the length of film;

a source of artificial illumination coupled to said third housing for movement between a retracted inoperative position, when said first, second and third housings are out of said extended operative position, and an erected operative position; and a linkage assembly for transferring movement of said source of artificial illumination toward said retracted inoperative position to said mirror assembly so as to move the latter toward said non-reflecting position.

11. A folding camera as defined in claim 10 wherein said source of artificial illumination engages said second housing as said first, second and third housings enter said extended, operative position and as said source of artificial illumination moves into its said erected operative position to releasably lock said first, second and third housings against further relative movement.

12. A folding camera as defined in claim 11 wherein said source of artificial illumination is constructed so as to be movable out of locking engagement with said second housing only after said mirror assembly has moved the majority of the distance toward said non-reflecting position.

* * * * *